United States Patent [19]

Cornelius et al.

[11] 4,364,524
[45] Dec. 21, 1982

[54] IRRIGATION CONTROL SYSTEM

[75] Inventors: Gail Cornelius, Portland; Lloyd C. Olson, Beaverton, both of Oreg.

[73] Assignee: R. M. Wade & Co., Portland, Oreg.

[21] Appl. No.: 188,588

[22] Filed: Sep. 18, 1980

[51] Int. Cl.³ ............................................. A01G 25/09
[52] U.S. Cl. ...................................... 239/720; 251/46
[58] Field of Search ................ 251/6, 9, 46; 239/177, 239/709-721

[56] References Cited

U.S. PATENT DOCUMENTS

| 4,080,991 | 3/1978 | Groelz | 239/710 X |
| 4,108,200 | 8/1978 | Cornelius | 239/720 |
| 4,155,679 | 5/1979 | Cornelius et al. | 239/720 X |
| 4,195,781 | 4/1980 | Scholz | 239/177 |

FOREIGN PATENT DOCUMENTS 395498 7/1933 United Kingdom ..................... 251/6

Primary Examiner—Andres Kashnikow
Attorney, Agent, or Firm—Phillips, Moore, Lempio & Finley

[57] ABSTRACT

An irrigation control system includes a rotary water motor which receives water from a valve, which has either a full on or a full off condition, depending on the alignment of an associated irrigation line. A pilot valve which is not susceptible to being clogged by contaminants that can be found in the water actuates the valve to the on or off position for controlling the water motor.

11 Claims, 3 Drawing Figures

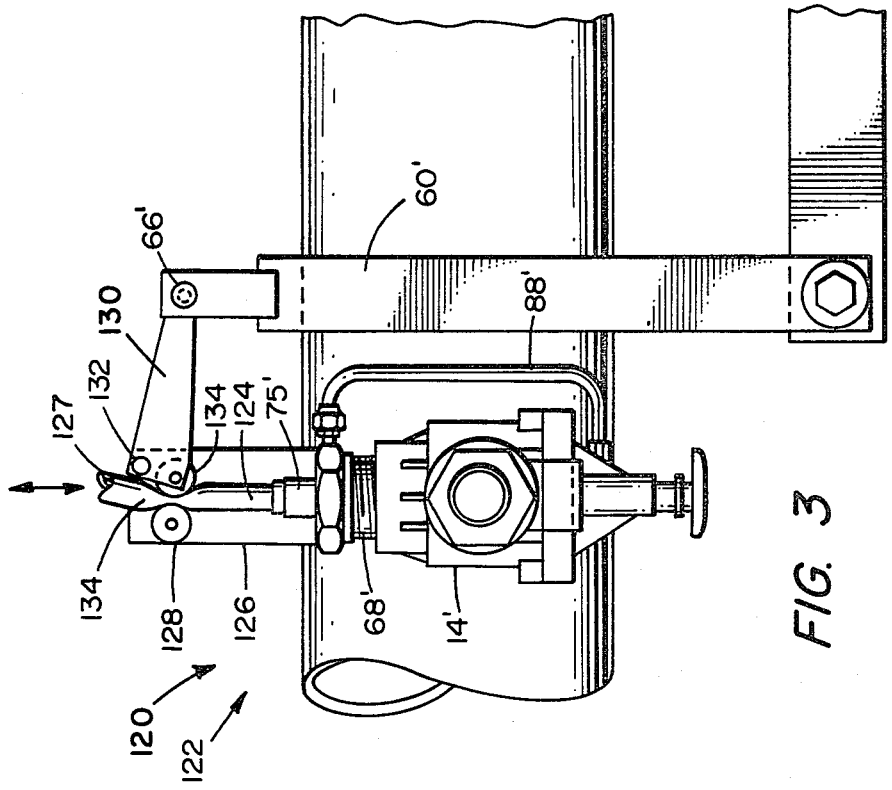
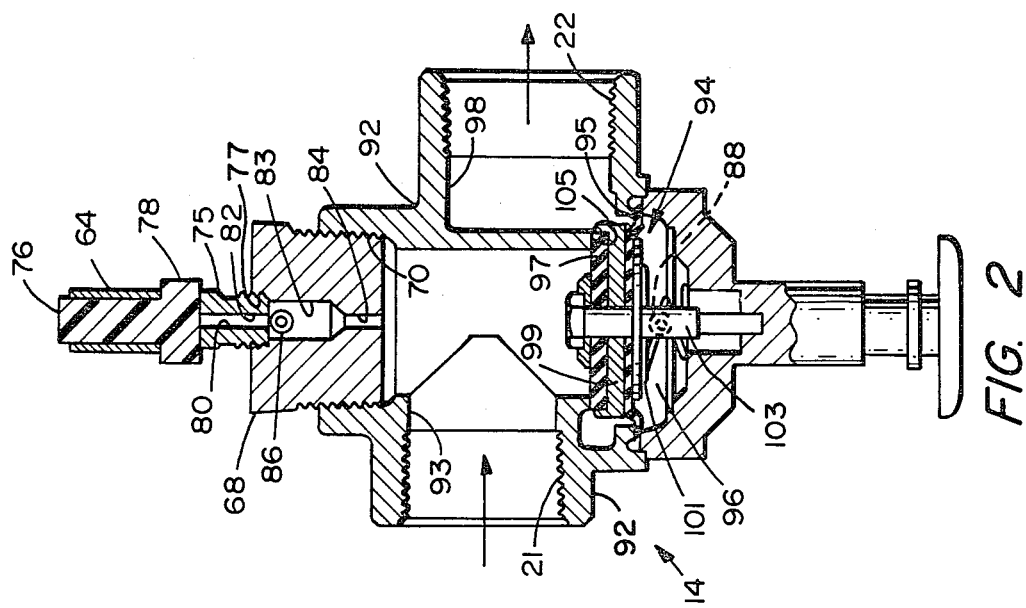

IRRIGATION CONTROL SYSTEM

Technical Field

This invention relates to an irrigation system, and more particularly to a system for controlling the operation of the irrigation system.

Background Art

In U.S. Pat. Nos. 4,108,200, issued on Aug. 22, 1978, and 4,155,679, issued on May 22, 1979, irrigation systems with control systems for maintaining the alignment of an irrigation line thereof are disclosed. These control systems include a linkage arrangement which is operatively associated with a valve which controls the flow of irrigation water from the irrigation line to a rotary water motor. The linkage arrangement reads the degree of misalignment of the various portions of the irrigation line to in turn open and close the valve to supply water pressure to the rotary water motor as needed. Such systems have been found highly effective in maintaining proper alignment of the irrigation line. However, there is a continuing need to provide improved control systems which are durable and dependable, which are not susceptible to contamination from the working environment of, for example, an agricultural field, and which allow an even distribution of water from the irrigation line due to the orderly progress of the line over the field to be irrigated.

The present invention is directed to accomplish such desired advantages as described hereinabove.

SUMMARY OF THE INVENTION

In one aspect of this invention the control system for a fluid motor of an irrigation system comprises a valve means for supplying fluid pressure to, and blocking fluid pressure to, the fluid motor, and means for actuating the valve means to provide an open valve means state and a closed valve means state. The actuating means includes an aperture means for draining fluid from said valve means to the environment and means for obstructing said aperture means, said obstructing means being movable to a position spaced from said aperture means to allow fluid to drain from said aperture means and said valve means.

In another aspect of this invention the means for obstructing includes a plug which can be selectively removed from a position covering the aperture means to allow fluid to drain from the valve means to the environment.

Still in another aspect of this invention, the obstructing means includes a pinching arrangement.

This control system is advantageous over the prior art in that, besides being economical to produce, it is quite reliable in operation in that it does not require closely fitting parts to effect the control of the valve means for controlling the alignment of the irrigation line. Some prior art devices do include such closely-fitting and moving parts which have a tendency to become contaminated and malfunction due to sand and grit which is found in the irrigation water. In the present invention, all moving parts are essentially exterior to the main flow of fluid through the actuating means, and thus the possibility of such contamination and clogging of the moving parts is eliminated. In fact, in the case of the actuating means, including a plug, the fluid can selectively flow thereover, cleansing said plug of contaminants.

In yet another aspect of the invention, the valve means includes a diaphragm and a control chamber adjacent thereto and the aperture communicates with said control chamber.

Thus, it can be appreciated that the present invention is highly dependable and efficient and can operate in the appropriate environment.

BRIEF DESCRIPTION OF THE DRAWINGS

FIG. 2 is a cross-sectional view taken through line II—II of FIG. 1.

FIG. 3 is a top view of an alternative embodiment of the invention mounted on an irrigation line.

DESCRIPTION OF THE PREFERRED EMBODIMENTS

Figure 1:
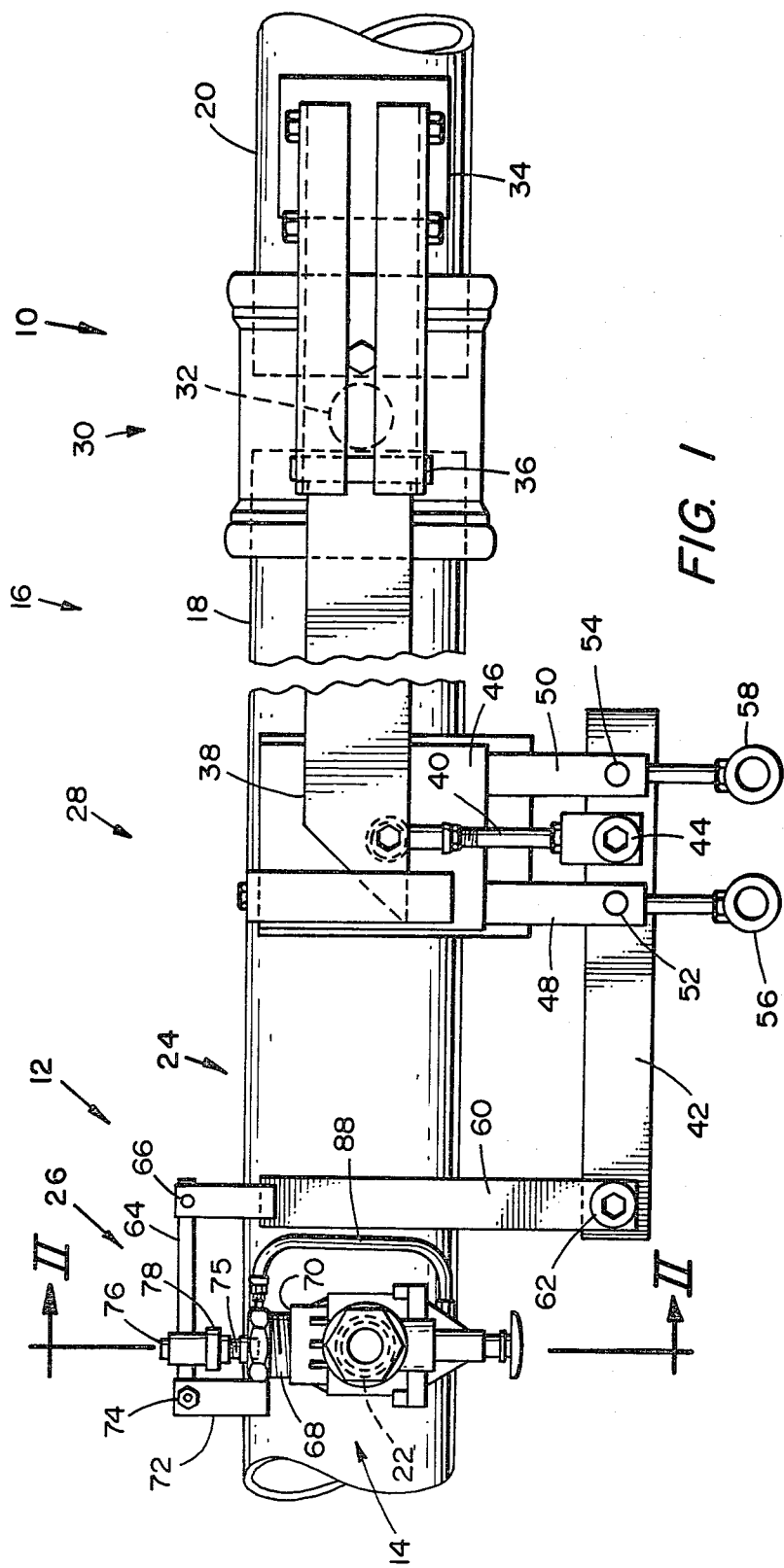
FIG. 1 depicts a plan view of an embodiment of the improved irrigation system control of the invention mounted on the water carrying irrigation line.

A portion of an irrigation system 10 is shown in FIG. 1, and reference is made to U.S. Pat. No. 4,108,200, which is incorporated by reference, wherein an alignment control system for an irrigation line is disclosed. In FIG. 1, the improved irrigation control system 12 includes a diaphragm operated, on-off valve 14, which selectively provides water to a water motor (not shown) disclosed in the above reference for aligning one portion of an irrigation line 16 with respect to an adjacent portion, as, for example, for aligning pipe section 18 with the adjacent pipe section 20. As will be described more fully hereinbelow, valve 14 receives water from irrigation line 16 through port 21 (FIG. 2) and delivers water to the water motor through port 22. Valve 14 is selectively controlled by an actuating means 24 which includes a pilot valve 26 and a linkage arrangement 28. Linking arrangement 28 is fully described in the above U.S. Pat. No. 4,108,200 and is only briefly described herein. Linking arrangement 28 transmits the position of pipe section 20 relative to section 16 to the water motor (not shown) mounted on a ground engaging tower (not shown) which supports and transmits pipe section 18 over a field.

Pipe sections 18 and 20 are connected by a flexible coupling 30 which will accommodate field slope differences of up to thirty degrees. Such slope differences cause the various pipe sections to proceed at varying speeds, and thus there is the need to control the entire irrigation system 10 so that all pipe sections are maintained in alignment.

Pipe sections 18 and 20 are additionally joined by ball and socket joint 32, with the socket thereof mounted to bracket 34 which is secured to pipe section 16 and the ball portion thereof mounted to pipe section 16. Rotatably pinned to bracket 34 about the axis of pin 36 is a bar connector 38. Secured to bar connector 38 is a link 40. A first arm 42 is pivotally pinned to link 40 at point 44. Mounted to a mount 46 are two slide bars 48 and 50. Associated with slide bars 48 and 50 are pivot pins 52 and 54, respectively. As fully described in U.S. Pat. No. 4,108,200, depending on the direction of rotation of the irrigation system 10, assuming a rotating irrigation system 10, only one of said pins 52 and 54 is inserted through an appropriate bore in slide bar 48 or slide bar 50 into an accommodating bore in arm 42. This pin acts as a pivot point for the first arm 42 with respect to the point 44 and the pilot valve 26. Fine adjustment members 56 and 58 can be used to, as indicated in the above patent, make fine adjustments in the linkage arrangement 28. Linkage arrangement 28 further includes a second arm 60 which is pivotally pinned to first arm 42 at point 62.

The pilot valve 26 of the invention includes an arm 64 which is pivotally pinned to second arm 60 at point 66. Pilot valve 26 includes a threaded bushing 68 which is inserted into a tapped aperture 70 in valve 14. A mounting bracket 72 is in a preferred embodiment welded to said bushing 68. Pivotally mounted to mounting bracket 72 is arm 64 at pivot point 74. A nozzle 75 is screwed into bore 77 of bushing 68. Nozzle 75 is replaceable if it should become worn due to sand or the line in the water abrading thereagainst.

Mounted to arm 64 is a plug 76 which is essentially T-shaped in cross section and in a preferred embodiment is comprised of an elastomeric material. The head 78 of plug 76 is positioned in FIG. 2 in closing contact with an aperture 80 which is defined by nozzle 75. In FIG. 2, aperture 80 communicates with a passage 82 defined by nozzle 75. Passage 82 communicates with passage 83 of bushing 68. Passage 83 has a restrictive orifice 84. Communicating with passage 83 between nozzle 75 and restricted orifice 84 is another passage 86 (FIG. 2) which communicates with a conduit 88 (FIG. 1) to supply water to pilot valve 26.

Valve 14 includes a valve housing 92 and a diaphragm assembly 94 which define a pilot pressure control chamber 96. Diaphragm assembly 94 includes a diaphragm 95, comprised preferably of an elastomeric material, a washer 97, also preferably comprised of an elastomeric material, a carrier 99 mounting the washer 97 to the diaphragm 95, a biasing spring 101, and a shaft 103 which is slidably disposed in bore 105 of housing 92. Housing 92 defines a passage 93 communicating with port 21 for receiving water from irrigation line 16 and a passage 98 which communicates with port 22 for selectively conducting water to the water motor (not shown). Spring 101 biases washer 97 into contact with valve seat 105 to obstruct communication of passage 93 with passage 98. As has been mentioned heretofore, valve 14 is an off-off valve in that washer 97 is either in a first position whereby passages 93 and 98 are out of communication so that no water is conducted to the water motor, or in a second position wherein passage 93 communicates with passage 98 and full water pressure is conducted to the water motor (not shown).

The operation of the control system 12 in the irrigation system 10 is as follows. If the sections 18 and 20 of the irrigation line 16 are in alignment as is shown in FIG. 1, the first and second arms 42 and 60 are arranged as shown so that the plug 76 presses against and is in sealing engagement with the aperture 80 of the pilot valve 26. So arranged, water pressure is supplied through pilot valve 26 and conduit 80 to the pilot pressure control chamber 96 of the valve 14. Accordingly, diaphragm 94 is urged more forcefully against seat 105, so that no water under pressure can be conducted to the water motor (not shown).

If pipe section 18 becomes misaligned from pipe section 20 as, for example, when one of the sections traverses an uneven ground contour, there exists a need to actuate the water motor such that the pipe section 18 can be moved back into alignment with pipe section 20. It should be noted that besides uneven contours, the normal operation of the irrigation system 10 is such that the water motors are actuated, serially down the irrigation line 16 to move one section forward and then the next and then the next, so that the entire line progresses. Uneven contours add the additional requirement that certain of the water motors must be operated for a longer period than others so that the irrigation line 16 is kept in alignment.

When arms 42 and 60 actuate the pilot valve 26, the arm 64 thereof is pivoted about pivot point 74 such that plug 76 becomes sealingly disengaged from the aperture 80. Accordingly, water from the passage 83 which is conducted through conduit 88 to operate diaphragm assembly 94 is drained through aperture 80 to the surrounding environment, and is in fact drained on to the ground. This being the case, the water pressure in pressure control chamber 96 is relieved, causing the pressure in passage 93 to urge diaphragm assembly 94 away from seat 105. Thus, water from irrigation line 16 can proceed to the water motor so that pipe section 18 can be moved into alignment with pipe section 20.

It is to be understood that pilot valve 26 can be designed without restrictive orifice 84; however, restrictive orifice 84 assists in the efficient operation thereof. Under the conditions depicted in FIG. 1 wherein the plug is in sealing engagement with the aperture 80, there is relatively no flow of water past restrictive orifice 84 and thus high pressure is maintained across the orifice and also in the pilot pressure control chamber 96. When the plug 76 is actuated away from the aperture 78 such that water is drained therefrom, the velocity of the water relative to the orifice increases, reducing the pressure in the orifice and accordingly assists in reducing the pressure in the pilot pressure control chamber 96 so that water is supplied to the water motor.

As the only moving part in the pilot valve 26 is essentially the plug 76 and as that plug is essentially located externally to conduit 88 and passage 83 which supply water which can contain contaminants such as sand and grit, pilot valve 26 is not susceptible to clogging. If some sand or grit should accumulate adjacent aperture 80 or on plug 76, when plug 76 is actuated to a position spaced from aperture 80, the sand will be purged from the pilot valve 26 to the environment. Accordingly, with no intricate internal moving parts having passages, the pilot valve 26 can operate quite successfully and, if required, with contaminated or dirty water.

A second embodiment of the control system of the invention is depicted in FIG. 3 and is generally denoted by the numeral 120. Control system 120 is similar to control system 12 in FIG. 1 and similar elements are given the same numerical designation with a prime immediately thereafter. The pilot valve 122 of control system 120 includes a threaded bushing 68' which is secured in a threaded bore of valve 14'. Said bushing 68' includes a passage and restrictive orifice arrangement which is similar to that of threaded bushing 68 (FIG. 1). Extending from threaded bushing 68' is a nozzle 75' and extending from nozzle 75' is a flexible conduit 124 which can be comprised of an elastomeric material. Mounting bracket 126 also extends from bushing 68'. Flexible conduit 124 ends at an opening or aperture 127. Secured to mounting bracket 126 is a first contact 128, which in a preferred embodiment can be a cylindrical roller pinned to bracket 126. Pivotally secured to mounting bracket 126 on the opposite side of flexible conduit 124 is an arm 130 at pivot point 132. Arm 130 is additionally pivotally secured to arm 60' at pivot point 66'. Mounted to arm 130 is a second contact 134, which in a preferred embodiment includes a cylindrical roller pinned to arm 132. The pivoting of arm 130 causes contact 134 to be actuated toward or away from contact 128. As contact 134 is actuated toward contact 128, the flexible conduit 124 is pinched, preventing the flow of water through aperture 130, and conversely as contact 134 is moved away from contact 128, water is allowed to flow through aperture 130.

The operation of control system 120 is similar to that of control system 12. When the pipe sections are in alignment, the flexible conduit 124 is obstructed as shown in FIG. 3 and, as with the control system 12, no water reaches the water motor and thus the pipe section is stationary. When the pipe sections become misaligned, the flexible conduit 124 and aperture 131 become unobstructed, allowing water to drain from the pilot pressure control chamber in the valve 14' so that water can flow through valve 14' to the water motor (not shown). The water motor causes the supporting tower and the section of the irrigation line associated with the control valve 14' to proceed so that sections of the line again come into alignment.

As with the embodiment of FIG. 1, the embodiment in FIG. 3 can work with dirty, contaminated water, in that the moving parts of the pilot valve 122 are external to the flow of water therethrough and thus cannot be clogged and contaminated by sand and the like which can be contained in the water.

Accordingly, the above embodiments solve the problems of the prior art in that they provide a control system which is economical, efficient, and quite reliable.

Other aspects, objects, and advantages of this invention can be obtained from a study of the drawings, the disclosure, and the appended claims.

We claim:

1. A control system for a fluid motor of an irrigation system comprising:
   valve means for supplying fluid pressure to and blocking fluid pressure to the fluid motor;
   means for actuating the valve means to provide an open valve means state and a closed valve means state;
   said actuating means including a pilot valve including an aperture and a plug and means for selectively moving said plug to a position obstructing said aperture and for selectively moving said plug to a position removed from said aperture to drain liquid from said pilot valve and said valve means;
   wherein said pilot valve includes an orifice located between said aperture and the valve means; and
   wherein said valve means includes a continuous diaphragm and a control pressure chamber adjacent thereto and wherein said orifice and said control pressure chamber are placed in communication by a conduit which is external to said valve means.

2. The control system of claim 1 wherein said irrigation system includes an irrigation line and said control system includes:
   a first conduit communicating between said valve means and said irrigation line; and
   a second conduit communicating between said valve means and the fluid motor.

3. The control system of claim 1 wherein said irrigation system includes an irrigation line having individual sections which can be misaligned with respect to each other, the actuating means including arm means for actuating the moving means when said sections are misaligned.

4. A control system for a fluid motor of an irrigation system comprising:
   valve means for supplying fluid pressure to and blocking fluid pressure to the fluid motor;
   means for actuating the valve means to provide an open valve means state and a closed valve means state;
   said actuating means including a pilot valve having a conduit and means for selectively pinching off said conduit and for selectively opening said conduit to drain fluid from said pilot valve and said valve means;
   wherein said pilot valve means includes an orifice located between said conduit and the valve means; and
   wherein said valve means includes a continuous diaphragm and a control pressure chamber adjacent thereto and wherein said orifice and said control pressure chamber are placed in communication by a conduit which is external to said valve means.

5. The control system of claim 4 wherein said means for pinching off includes a cam.

6. The control system of claim 4 wherein said means for pinching off includes:
   first and second contacts with said conduit located therebetween;
   means for camming one of said first and second contacts to pinch off said conduit between said contacts.

7. The control system of claim 6 wherein said first and second contacts include first and second rollers.

8. The control system of claim 4 wherein said irrigation system includes an irrigation line and said control system includes:
   a first conduit communicating between said valve means and said irrigation line; and
   a second conduit communicating between said valve means and the fluid motor.

9. The control system of claim 4 wherein said irrigation system includes an irrigation line having individual sections which can be misaligned with respect to each other, the actuating means including arm means for actuating the pinching means when said sections are misaligned.

10. A control system for a liquid motor of an irrigation system comprising:
    valve means for supplying fluid pressure to and blocking fluid pressure to the liquid motor;
    means for actuating the valve means to provide an open valve means state and a closed valve means state;
    said actuating means including aperture means for draining fluid from said valve means and means for obstructing the aperture means, which obstructing means is moveable to a position spaced from said aperture means to allow fluid to drain from said aperture means and said valve means;
    wherein said actuating means includes an orifice located between said aperture means and the valve means; and
    wherein said valve means includes a continuous diaphragm and a control chamber adjacent thereto and wherein said orifice and said control chamber are placed in communication by a conduit which is external to said valve means.

11. The control system of claim 10 wherein said irrigation system includes an irrigation line having individual sections which can be misaligned with respect to each other, the actuating means including arm means for actuating the obstructing means when the sections are misaligned.

* * * * *